US008102551B2

(12) United States Patent  
Shiohara et al.

(10) Patent No.: US 8,102,551 B2  
(45) Date of Patent: Jan. 24, 2012

(54) IMAGE PROCESSING APPARATUS, METHOD OF DISPLAYING RAW FILE INFORMATION, AND COMPUTER PROGRAM PRODUCT

(75) Inventors: Ryuichi Shiohara, Matsumoto (JP); Ichiro Fujii, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 964 days.

(21) Appl. No.: 11/903,611

(22) Filed: Sep. 24, 2007

(65) Prior Publication Data

US 2008/0074508 A1  Mar. 27, 2008

(30) Foreign Application Priority Data

Sep. 25, 2006  (JP) ................... 2006-258923  
Jun. 26, 2007  (JP) ................... 2007-167317

(51) Int. Cl.  
*G06F 3/12* (2006.01)  
*G06K 15/00* (2006.01)

(52) U.S. Cl. ........ 358/1.15; 358/1.6; 358/1.16; 358/1.13

(58) Field of Classification Search ................. 358/1.15, 358/1.14, 1.18, 1.1, 1.6, 1.16, 1.17, 1.11, 358/1.2, 400, 401, 403, 404, 407, 437, 444, 358/468, 1.13, 426.05, 426.06, 426.13, 426.14, 358/1.9, 516, 518, 512, 534, 535, 536; 348/207.99, 348/207.1, 207.11, 207.2, 222.1; 347/2, 347/3, 5, 14, 23; 399/1, 8, 9; 710/8, 15, 710/62, 64, 72; 715/200, 273, 274; 382/162, 382/166, 167  
See application file for complete search history.

(56) References Cited

U.S. PATENT DOCUMENTS

| 7,061,635 B1* | 6/2006 | Wanda et al. ................. 358/1.15 |
| 2004/0095600 A1* | 5/2004 | Nitta et al. ................... 358/1.15 |
| 2004/0139248 A1* | 7/2004 | Kim et al. ......................... 710/38 |
| 2004/0212824 A1* | 10/2004 | Ohara ........................... 358/1.15 |
| 2005/0033719 A1* | 2/2005 | Tirpak et al. ...................... 707/1 |
| 2005/0038812 A1* | 2/2005 | Tirpak et al. ................ 707/104.1 |
| 2006/0018223 A1* | 1/2006 | Ji et al. ......................... 369/47.12 |
| 2006/0221367 A1* | 10/2006 | Shiokawa ..................... 358/1.13 |
| 2007/0086042 A1* | 4/2007 | Herold et al. ................. 358/1.15 |
| 2007/0279689 A1* | 12/2007 | Aoki et al. .................... 358/1.16 |
| 2008/0007756 A1* | 1/2008 | Tanaka et al. ................ 358/1.13 |
| 2008/0007781 A1* | 1/2008 | Oike et al. .................... 358/1.16 |
| 2008/0030780 A1* | 2/2008 | Izawa ............................ 358/1.16 |
| 2008/0278599 A1* | 11/2008 | Shiohara .................... 348/222.1 |

FOREIGN PATENT DOCUMENTS

JP  11-321029  11/1999

(Continued)

*Primary Examiner* — Dov Popovici  
(74) *Attorney, Agent, or Firm* — Nutter McClennen & Fish LLP; John J. Penny, Jr.; Michael P. Visconti, III

(57) ABSTRACT

An image processing apparatus for performing a developing process on RAW image data included in a specific RAW file. The image processing apparatus includes a decision module and a display. The decision module decides whether a RAW file is developable or not in the image processing apparatus on the basis of the file name for each RAW file acquired by the image processing apparatus. The display displays at least one of information relating to the RAW files decided by the decision module to be developable in the image processing apparatus, and information relating to the RAW files decided to be undevelopable in the image processing apparatus.

10 Claims, 6 Drawing Sheets

FOREIGN PATENT DOCUMENTS

| | | |
|---|---|---|
| JP | 2001054042 A | 2/2001 |
| JP | 2001-223979 A | 8/2001 |
| JP | 2005-33468 | 2/2005 |
| JP | 2005-102118 | 4/2005 |
| JP | 2005-150780 A | 6/2005 |
| JP | 2005-349664 | 12/2005 |

* cited by examiner

IMAGE PROCESSING APPARATUS, METHOD OF DISPLAYING RAW FILE INFORMATION, AND COMPUTER PROGRAM PRODUCT

CROSS REFERENCE TO RELATED APPLICATIONS

This application relates to and claims priority from Japanese Patent Applications No. 2006-258923 filed on Sep. 25, 2006 and No. 2007-167317 filed on Jun. 26, 2007, the entire disclosures of which are incorporated herein by reference.

BACKGROUND OF THE INVENTION

1. Field of the Invention

The present invention relates to an image processing apparatus able to carrying out a developing process on RAW image data.

2. Description of the Related Art

In recent years, digital cameras that are capable of saving RAW image data have become available on the market. RAW image data refers to data obtained by A/D conversion of the signal output by the digital camera's image sensor (such as a CCD or CMOS). That is, RAW image data represents data prior to being subjected to image processing to generate picture (hereinafter termed "developing"); the data will become viewable as a picture only when subjected to a developing process. Thus, RAW image data can be thought of as "raw" data prior to any processing.

Where RAW image data is saved in a digital camera, it will be saved as a RAW file, in an image recording format known as the RAW format. However, since the RAW format is not a standardized specification, in many instances RAW files saved by digital cameras of different models or made by different manufacturers will be mutually incompatible, despite having the same RAW format designation. Specifically, the file extension, developing parameters, data structure, RAW image data compression technique, or other properties may differ. Here, developing parameters refers to information of various kinds required for the purpose of developing RAW image data, such as the optical black value, white balance information, arrangement information for the color filters of the image sensor, color space information, tone correction information, and so on.

Where a RAW file save by a digital camera is to be subjected to a digital developing process on a computer or the like, since RAW files are mutually incompatible depending on the digital camera model or manufacturer, a general-purpose software cannot be employed for the developing process. Consequently, individual manufacturers provide proprietary software for computer development of RAW image data contained in RAW files; in many cases, when the user wishes to print a RAW file, he or she will use this proprietary software to carry out the developing process of the RAW image data on the computer, save the image data in some universal format such as the JPEG format, then transfer it to the printer for printing.

Some printers have the capability of printing when a digital camera is connected to the printer via a USB cable or the like, or when the memory card of a digital camera is inserted into a memory slot in the printer (hereinafter termed "direct printing"). Technologies whereby a direct printer can be employed for direct printing of RAW files saved on a digital camera are under study. A technology whereby JPEG image data included in RAW files is extracted within the digital camera, and transferred to the printer for direct printing is described in JP2005-33468A, for example. Technologies whereby RAW files can be developed within the printer to enable direct printing are also under study.

As mentioned above, since RAW files created by digital cameras of different models or manufacturers are mutually incompatible, where RAW files are to be developed in the printer, it will be necessary for the printer to be provided, for each type of RAW file, with the information necessary to develop the RAW image data (hereinafter termed developing information). Accordingly, where the printer is provided in advance with developing information for RAW files in certain specific RAW formats, it will be possible for the developing process to be carried out on RAW files in those RAW formats within the printer, so that direct printing is possible. On the other hand, for RAW files in RAW formats for which the printer lacks developing information, the developing process cannot be carried out within the printer, and thus direct printing will not be possible.

For example, where a digital camera A made by manufacturer A and a digital camera B made by manufacturer B are models respectively capable of saving RAW image data, assuming that a direct printer C is provided with developing information for RAW files A saved by digital camera A, but not provided with developing information for RAW files B saved by digital camera B, while direct printing using printer C will be possible for RAW files A, direct printing will not be possible for RAW files B.

Consequently, when a user has saved RAW image data from both digital cameras A and B on a single memory card, if direct printing is attempted using the printer C, while it will be possible to print the RAW files A, it will not be possible to print the RAW files B. That is, in instances where RAW files of multiple types have been saved to a single memory card, some files can be printed by direct printing, while other files cannot. In such instances the user may feel inconvenienced if he or she cannot quickly ascertain which RAW files saved on the memory card can be printed, and which cannot.

This problem is one that is common to image processing apparatus having the ability to carry out developing processing of RAW image data, such as photo storage devices, computers, and the like.

SUMMARY OF THE INVENTION

An object of the present invention is to improve convenience for the user when carrying out developing processing of RAW image data included in RAW files.

In one aspect of the present invention, there is provided an image processing apparatus for performing a developing process on RAW image data included in a specific RAW file. The image processing apparatus comprises a decision module and a display. The decision module decides whether a RAW file is developable or not in the image processing apparatus on the basis of the file name for each RAW file acquired by the image processing apparatus. The display displays at least one of information relating to the RAW files decided by the decision module to be developable in the image processing apparatus, and information relating to the RAW files decided to be undevelopable in the image processing apparatus.

The term RAW image data is refers herein to a concept that includes data obtained by converting pixel values output by the image pickup device of the digital camera (e.g. a CCD, CMOS etc.) as-is to digital data, as well as data obtained by compression of such digital data. Compression may involve a reversible compression format or an irreversible compression format. A reversible compression format refers to a compression format with no data loss whatsoever; when code compressed with a reversible compression format is decoded, the data prior to compression can be completely recovered. An irreversible compression format refers to a format in which data is compressed in such a way that part of the data cannot be recovered, yet in a form sufficiently useful as picture information. An exemplary method would be to quantize the data when recording bright image locations, for example. When data compressed in such a format is decoded, the data prior to compression cannot be completely recovered and data for bright locations will become discrete data; however, as image data of bright locations has no appreciable effect on tone representation, using data in this format, it will be possible nevertheless to develop an image maintaining sufficient picture quality.

According to this image processing apparatus, where the image processing apparatus is provided for example with an extension table describing at least one file extension for RAW files of type possible for the image processing apparatus to develop, it can be determined on an individual basis on the basis of the extension table whether RAW files stored in a storage medium are developable; and to then display the file names of developable RAW files or the total number of developable RAW files. It will also be possible to display the file names of undevelopable RAW files, the total number of undevelopable RAW files, or similar information. Of course, rather than using an extension table of this kind, the determination could be made on the basis of other information, such as a naming convention for file names of RAW files of types it is possible for the image processing apparatus to develop.

Consequently, by looking at the display, a user will be able to ascertain the file names, the number of files, or other information regarding RAW files developable by the image processing apparatus or undevelopable RAW files, from among multiple RAW files stored in a storage medium. Since determinations are made on the basis of file names, determinations can be made and displayed with a short time period.

The present invention can be realized in various aspects. For example, the present invention can be realized in aspects such as a computer program for building an image processing apparatus; a recording medium having such a computer program recorded thereon; a data signal encoded in a carrier wave that incorporates this computer program; or a method of displaying RAW file information.

These and other objects, features, aspects, and advantages of the present invention will become more apparent from the following detailed description of the preferred embodiments with the accompanying drawings.

DESCRIPTION OF THE PREFERRED EMBODIMENTS

Next, aspects of the present invention will be described in the following order on the basis of embodiment:
A. Embodiment 1
A1. Configuration of Embodiment 1
A2. Operation of Embodiment 1
B. Embodiment 2
C. Variations A. Embodiment 1

A1. Configuration of Embodiment 1

The printer 100 is a color ink-jet printer capable of direct printing. A "normal printing mode" for printing a JPEG file saved in the JPEG format, and a "RAW printing mode" for printing a RAW file saved in the RAW format are provided by way of direct printing modes of the printer 100. The RAW printing mode involves developing and printing the RAW image data.

Figure 1:
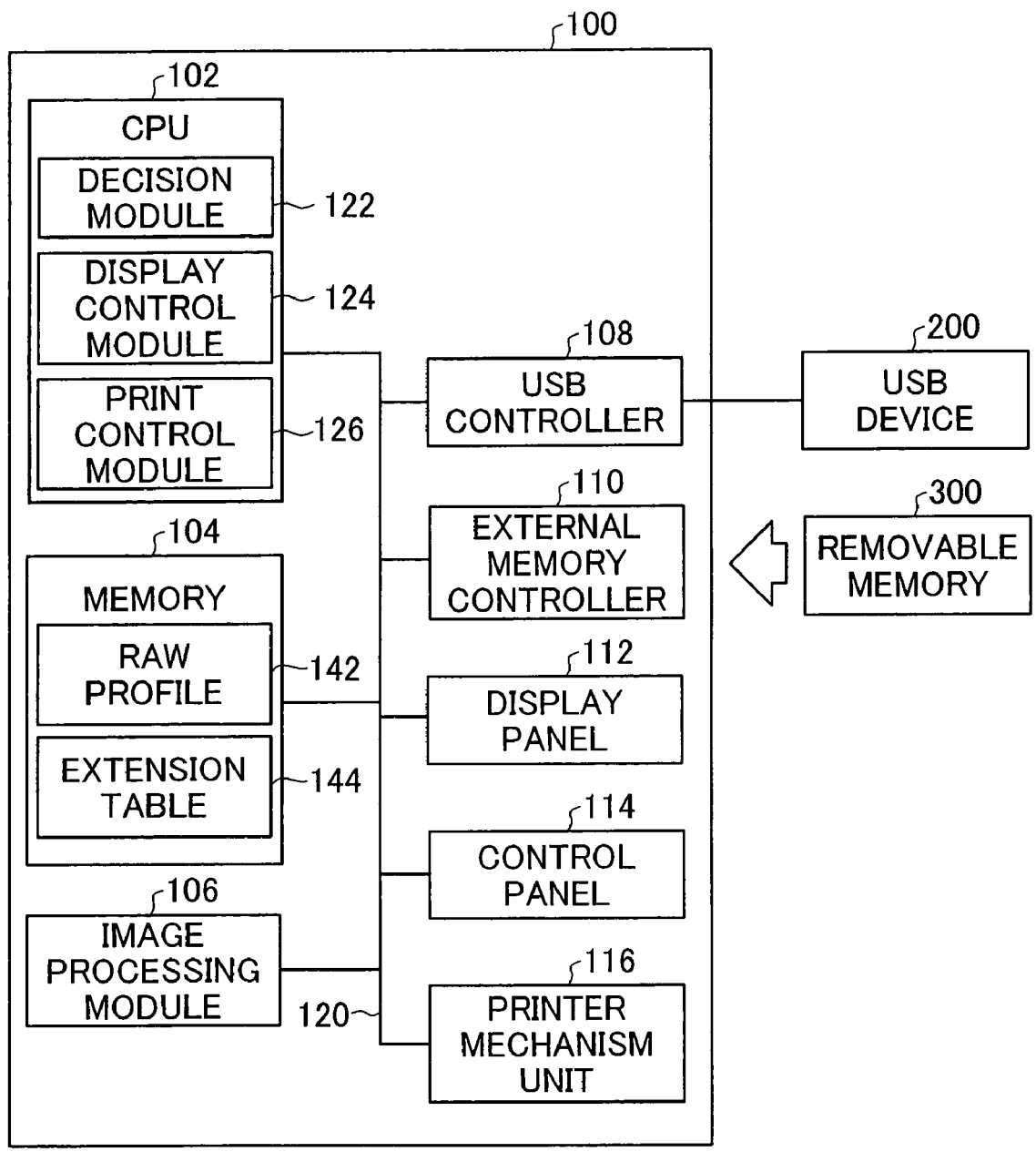
FIG. 1 is a block diagram showing the construction of a printer 100 as an embodiment of the present invention.

FIG. 1 is a block diagram showing the printer 100 in Embodiment 1 of the present invention. The printer 100 includes a CPU 102 for carrying out processing and control of various kinds in accordance with a computer program; a memory 104; an image processing module 106; a USB controller 108 for communicating with a USB device 200 such as a digital camera, HDD, CD drive, or other drive; an external memory controller 110 for loading data stored in a removable memory 300; a display panel 112 composed of an LCD or the like, for displaying menus, pictures, and so on; a control panel 114 equipped with various push buttons (not shown), such as a cross button for navigating the menus, a print command button, and so on; a printer mechanism unit 116 for printing pictures etc. onto printing paper in accordance with an instruction from the CPU 102; and a bus 120 connecting these constituent elements. In accordance with a computer program for printer purposes, the CPU 102 functions as a decision module 122, display control module 124, or print control module 126, described later. The display control module 124 and the display panel 112 in the embodiment correspond to the display taught in the appended Claims.

The memory 104 is composed partly of ROM and partly of rewritable nonvolatile memory. The computer program for printer purposes is stored in the ROM. Consequently, the computer program is provided in a form recorded in ROM. However, instead of using ROM, computer program could be read out from a CD-ROM drive, transferred to the printer via a network (not shown), and written to the aforementioned nonvolatile memory.

A RAW profile 142 is stored in the rewritable nonvolatile memory. The RAW profile 142 describes file extensions of RAW files developable by the printer 100, the name of the manufacturer, the model name, developing parameters, compression format, and similar data. Here, developing parameters refers to parameters required during developing of the RAW image data, such as the optical black value, white balance information, arrangement information for the color filters of the image sensor, color space information, tone correction information, and so on. The RAW profile 142 can be updated by means of transferring a new RAW profile 142 to the printer 100 from the printer manufacturer's home page via a network, not shown, or other arrangement.

The image processing module 106 is a dedicated processor for image processing, that carries out a developing process on the RAW image data and generates print image data suitable for printing; or generates print image data on the basis of JPEG data. The developing process refers to a series of imaging processes performed on RAW image data, including a bit count integration process, an optical black correction process, a white balance correction process, an exposure correction process, and a demosaicing process, followed by a color reproduction process, a tone correction process, and so on.

A2. Operation of Embodiment 1

The operation of Embodiment 1 will now be described. Assume by way of a example that a user has taken pictures using a compact digital camera A (hereinafter abbreviated as Camera A), a digital SLR camera B (hereinafter abbreviated as Camera B), and a digital SLR camera C (hereinafter abbreviated as Camera C), and has saved the photographic image data on a single removable memory 300 shared among Cameras A, B, and C. Cameras A, B, and C are all capable of saving photographic images in RAW format, and when using each camera the user has elected to save photographic images in RAW format.

Where an image taken with Camera A has been saved in RAW format, a RAW file A of file format A will be created. This RAW file A is given a file name with the extension "AAA" appended to a string of digits assigned consecutively in the shooting order. Where an image taken with Camera B has been saved in RAW format, a RAW file B of file format B will be created. This RAW file B is given a file name with the extension "BBB" appended to a string of digits assigned consecutively in the shooting order. Where an image taken with Camera C has been saved in RAW format, a RAW file C of file format C will be created. This RAW file C is given a file name with the extension "CCC" appended to a string of digits assigned consecutively in the shooting order.

Let it be assumed that RAW files A with the file names "0001.AAA" through "0004.AAA", RAW files B with the file names "0001.BBB" through "0007.BBB", and RAW files C with the file names "0001.CCC" through "0005.CCC" have been saved to the removable memory 300.

In the present embodiment, the RAW profile 142 saved in the memory 104 of the printer 100 describes information relating to Camera A and Camera B, but does not describe information relating to the RAW files C. Consequently, the printer 100 will not be able to develop RAW image data contained in RAW files C, and thus for the RAW files C, the user will not be able to carry out direct printing using the printer 100.

When the printer 100 is started up, the user inserts the removable memory 300 storing the multiple types of RAW files A, B, C into the card slot (not shown) of the printer 100 in order to connect the removable memory 300 to the external memory controller 110, whereupon the CPU 102 recognizes the removable memory 300.

Figure 2:
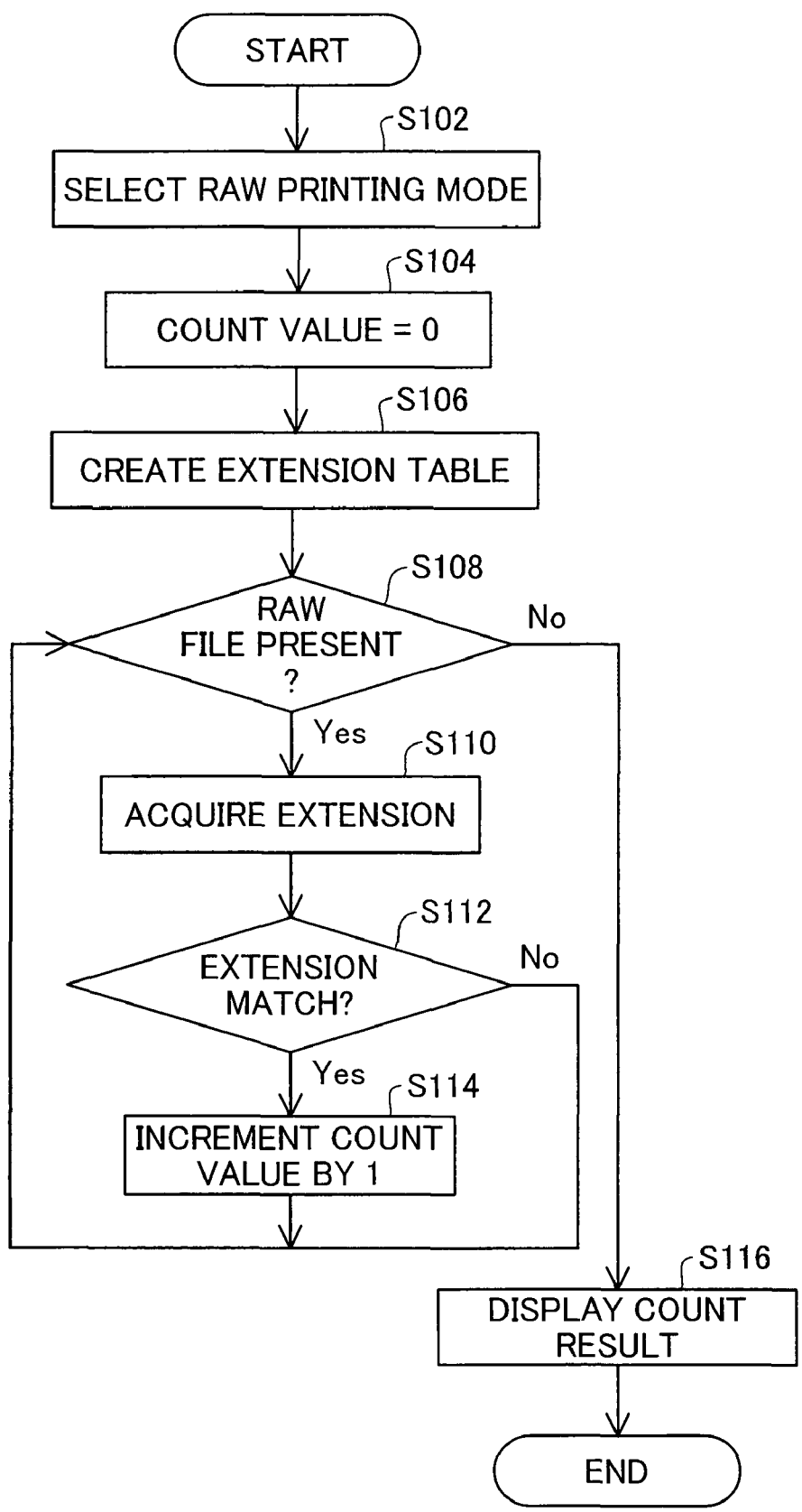
FIG. 2 is a flowchart showing a process for displaying on a display panel the total number of RAW files of type developable in the printer 100.

FIG. 2 is a flowchart showing a process for displaying on the display panel the total number of RAW files of type developable in the printer 100. When the user, using the control panel 114, selects RAW printing mode from the menu screen displayed on the display panel 112, the decision module 122 will recognize that RAW printing mode has been selected (Step S102), and will set to zero the count value stored in the memory 104 (Step S104). Extensions are then extracted from the information described in the RAW profile 142 stored in the memory 104, and an extension table 144 is created (Step S106). Here, since the RAW profile 142 describes information relating to RAW files A and B, the extension table 144 will describe "AAA" and "BBB."

Next, the decision module 122 will decide in succession for each RAW file stored in the removable memory 300 whether the extension included in the file name of the RAW file matches any of the extensions described in the extension table 144. Specifically, via the external memory controller 110, the decision module 122 searches the multiple RAW files stored in the removable memory 300, recognizes the RAW file "0001.AAA" that was the first to be recorded (Step S108), and acquires its file extension "AAA" (Step S110). Since as noted earlier the extension "AAA" is described in the extension table 144, the decision module 122 will determine through lookup in the extension table that there is an extension match for the RAW file "0001.AAA" (Yes in Step S112); it will then increment the count value by 1 (i.e. to a count value=1), and save the file name "0001.AAA" in the memory 104 as a developable RAW file (Step S114).

The decision module 122 will then search for the next RAW file and recognize the file "0002.AAA" (Yes in Step S108), whereupon in the same manner as previously it will determine that there is an extension match, increment the count value by 1, and store the file name in the memory 104. Decisions will be made in the same manner up through the RAW file "0004.AAA." At this point, the count value will be 4, and the file names "0001.AAA" through "0004.AAA" will be stored in the memory 104 as developable RAW files. The decision module 122 will then search for the next RAW file, recognize the file "0001.BBB" (Yes in Step S108), and make a determination for the file "0001.BBB" in the same manner as previously. Since as noted earlier the extension "BBB" is also described in the extension table 144, the decision module 122 will determine that there is an extension match for the RAW file "0001.BBB" as well. In the same manner it will determine that the extensions match for the RAW files "0002.BBB" through "0007.BBB" as well; and for each single RAW file, the count value will be incremented by 1 and the file name will be saved to the memory 104 as a developable RAW file. At this point, the count value will be "11," and the file names "0001.BBB" through "0007.BBB" will be stored in the memory 104 as developable RAW files.

The decision module 122 will then search for the next RAW file, recognize the file "0001.CCC" (Yes in Step S108), and make a determination for the file "0001.CCC" in the same manner as previously. Since as noted earlier the RAW profile 142 does not describe information relating to RAW files C, the extension table 144 does not include the extension "CCC." Consequently, for the RAW file "0001.CCC", the decision module 122 will decide that there is no extension match. Similarly, the decision module 122 will decide that there is no extension match for the RAW files "0002.CCC" through "0005.CCC." In the event of a decision by the decision module 122 that there is no extension match, the count value will not be incremented, and the file name will not be saved. Accordingly, at this point in the decision process, the count value will be "11," and the file names "0001.AAA" through "0004.AAA" and "0001.BBB" through "0007.BBB" will be stored in the memory 104 as developable RAW files.

The decision module 122 will then search for the next RAW file and recognize that there is no next RAW file (No in Step S108), whereupon it will issue an instruction to the display control module 124 to display the image selection screen W1 (discussed later); the display control module 124 will then display the count value (=11) on the image selection screen W1 displayed on the display panel 112 (Step S116).

Figure 3:
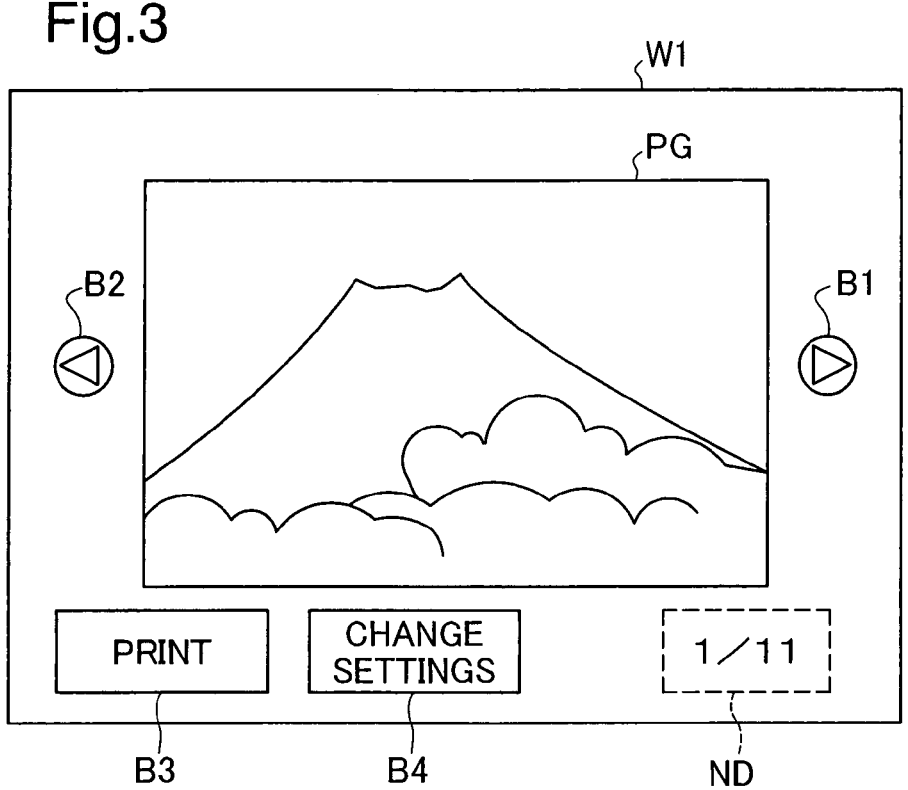
FIG. 3 is a diagram showing an image selection screen W1.

FIG. 3 is a diagram showing the image selection screen W1 displayed on the display panel 112. The image selection screen W1 is a screen that enables the user to verify RAW files that are stored in the removable memory 300, to instruct printing, and to modify image processing settings such as brightness. The image selection screen W1 includes a preview image display screen PG, a picture number display field ND, a Forward button B1, a Back button B2, a Print button B3, and a Change Settings button B4.

The preview image display screen PG loads and displays preview images recorded in RAW files that have been determined to be developable; the picture number display field ND indicates the sequence number of the currently displayed preview image, in the total number of developable (printable) RAW files. The Forward button B1 is a button for advancing the displayed preview image to the next one; the Back button B2 is a button for going back sequentially; the Print button B3 is a button for instructing RAW printing of the image currently displayed in the preview image display screen PG; and the Change Settings button B4 is a button for changing the settings for image processing of the RAW file of the currently displayed preview image. Here, the aforementioned count value (=11) is displayed in the picture number display field ND, as the total number of developable (printable) files.

On the basis of file names determined to have matching extensions and saved as developable RAW files in the memory 104 in the process discussed above, the display control module 124 will acquire screen nail data contained in the RAW files stored in the removable memory 300, and display it on the preview image display screen PG of the image selection screen W1. Here, screen nail data refers to image data in JPEG format generated for preview display purposes by the digital camera. In the present embodiment, the screen nail data is assumed to be contained in the RAW files.

By displaying on the image selection screen W1 the total number of RAW files printable (developable) by the printer 100, the user can ascertain how many pictures are printable, from among the RAW files stored in the removable memory 300.

Figure 4:
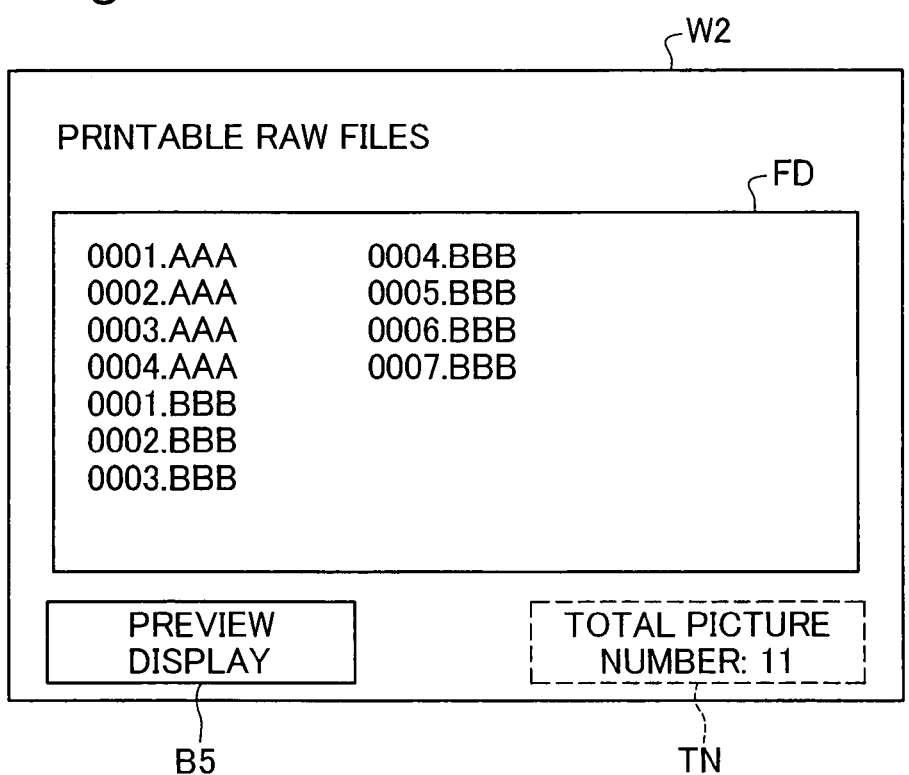
FIG. 4 is a diagram showing a file selection screen W2.

A file selection screen W2 like that shown in FIG. 4 may be displayed when the user has changed the display mode through operation of the control panel 114. FIG. 4 is a diagram showing the file selection screen W2; the file selection screen W2 includes a file name display field FD, a Preview Display button B5, and a total picture number display field TN. The file name display field FD displays the file names (including extensions) of developable RAW files; the total picture number display field TN displays the total number of developable RAW files, expressed as the number of printable photographs. Specifically, the count value mentioned earlier is displayed in the total picture number display field TN. When the user selects a desired file and then selects the Preview Display button B5, a preview image (not shown) will be displayed. Since RAW files that the decision module 122 has determined to be developable can be developed and printed by the printer, the file selection screen W2 will display these files as "developable RAW files" to make it easy for the user to understand.

As discussed earlier, file names (including extensions) of RAW files determined by the decision module 122 to have matching extensions are saved to the memory 104 as developable RAW files. The display control module 124 will read out the file names of the developable RAW files from the memory 104 and display them in the file name display field FD of the file selection screen W2. Specifically, "0001.AAA" through "0004.BBB" and "0001.BBB" through "0007.BBB" will be displayed in the file name display field FD. The display control module 124 reads out the count value (=11) saved in the memory 104, and displays it in the total picture number display field TN of the display panel 112.

Once the file names of developable (printable) RAW files are displayed in this way, by operating the control panel 114 the user will be able to select a desired file name in order to display a preview image or instruct printing. The user will also be able to distinguish which pictures were taken with which camera, by checking differences among extensions for example.

When the user has checked preview images of the RAW files from the image selection screen W1 and decided to print the RAW file "0001.AAA," he or she will display a preview image of the RAW file "0001.AAA" in the preview image display field PG of the image selection screen W1 and select the Print button B3, whereupon the printing control module 126 will transfer the RAW image data contained in the RAW file "0001.AAA" from the removable memory 300 to the memory via the external memory controller 110, and instruct the image processing module 106 to perform image processing. The image processing module 106 will then perform image processing of the RAW image data on the basis of the developing parameters included in the RAW profile which is stored in the memory 104, and generate image data for printing. When the image processing module 106 then outputs the image data for printing to the printer mechanism unit 116, an image of the selected RAW file "0001.AAA" will be printed on the printing paper by the printer mechanism unit 116.

B. Embodiment 2

Next, Embodiment 2 will be described. The printer of Embodiment 2 is identical in configuration to the printer 100 of Embodiment 1, and therefore its configuration will not be described. In the present embodiment, the total number of undevelopable RAW files is displayed as the counter result (Step S116), processing is otherwise similar to Embodiment 1; processing in common with Embodiment 1 will not be described. In the present embodiment, as in Embodiment 1, it is assumed that the user takes pictures using Camera A, Camera B, and Camera C; and that photographic image data taken using Cameras A, B, and C has been saved on a single removable memory 300.

When the removable memory 300 is inserted into the card slot (not shown) of the printer and connected to the external memory controller 110, the CPU 102 recognizes the removable memory 300, counts the total number of RAW files stored in the removable memory 300, and saves the total number of RAW files ("16" in the present embodiment) to the memory 104. The decision module 122 repeats Steps S108 through 114 for all of the RAW files stored in the removable memory 300 and determines whether they are developable by the printer, and as a result of which the count value will be "11." The decision module 122 then subtracts the count value "11" from the total number of RAW files ("16") stored in the removable memory 300 to arrive at a count of "5," i.e. the total number of undevelopable RAW files, which is displayed on the display panel 112 (Step S116).

By means of this arrangement, the user can ascertain the total number of unprintable (undevelopable) RAW files, and when the total number of unprintable is considerable, elect to perform image processing on the computer to save the files in JPEG format, and then print the JPEG images with the printer.

C. Embodiment 3

Next, Embodiment 3 will be described. The printer of Embodiment 3 is identical in configuration to the printer 100 of Embodiment 1, and therefore its configuration will not be described. In the present embodiment, both the total number of developable RAW files and the total number of undevelopable RAW files are displayed as the count results (Step S116). Specifically, while the process subsequent to Step S112 differs, processing is otherwise similar to Embodiment 1; processing in common with Embodiment 1 will not be described. In the present embodiment, as in Embodiment 1, it is assumed that the user takes pictures using Camera A, Camera B, and Camera C; and that photographic image data taken using Cameras A, B, and C has been saved on a single removable memory 300.

Figure 5:
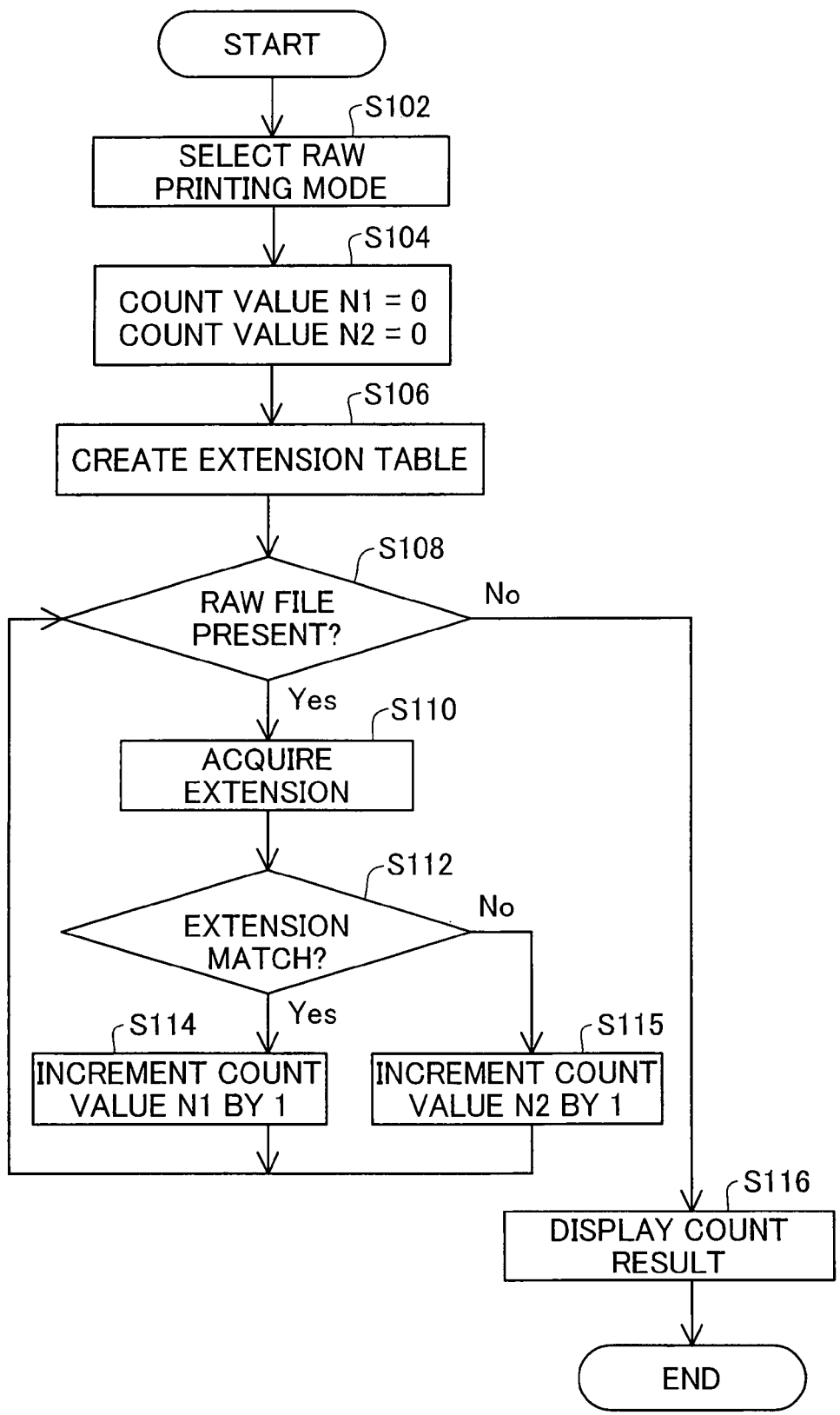
FIG. 5 is a flowchart showing a process for displaying on a display panel the total number of files developable in the printer and the total number of undevelopable files.

FIG. 5 is a flowchart showing a process for displaying on the display panel the total number of files developable in the printer and the total number of undevelopable files. In the present embodiment, when the user selects RAW printing mode, the decision module 122 will recognize that RAW printing mode has been selected (Step S102) and set to zero the count value N1 and the count value N2 stored in the memory 104 (Step S104). Then, the process of Steps S106 through 112 will be performed in the same manner as in Embodiment 1. In Step S112, when the extension of a RAW file matches any of those in the extension table (Yes in Step S112), the count value N1 will be incremented, and the name of the file will be stored as a developable RAW file in the memory 104 (Step S114). If on the other hand in Step S112 the extension of a RAW file does not match any of those in the extension table (No in Step S112), the count value N2 will be incremented, and the name of the file will be stored as an undevelopable RAW file in the memory 104 (Step S115).

In the same manner as in Embodiment 1, Steps 108 through 114 (or Step S115) are repeated for each of the RAW files stored in the removable memory 300, to determine whether they are developable by the printer and count the numbers of each. Once decisions have been completed for all of the RAW files (No in Step S108), the count value N1 is displayed on the display panel 112 as the total number of RAW files developable by the printer, and the count value N2 is displayed as the total number of RAW files undevelopable by the printer (Step S116).

Figure 6:
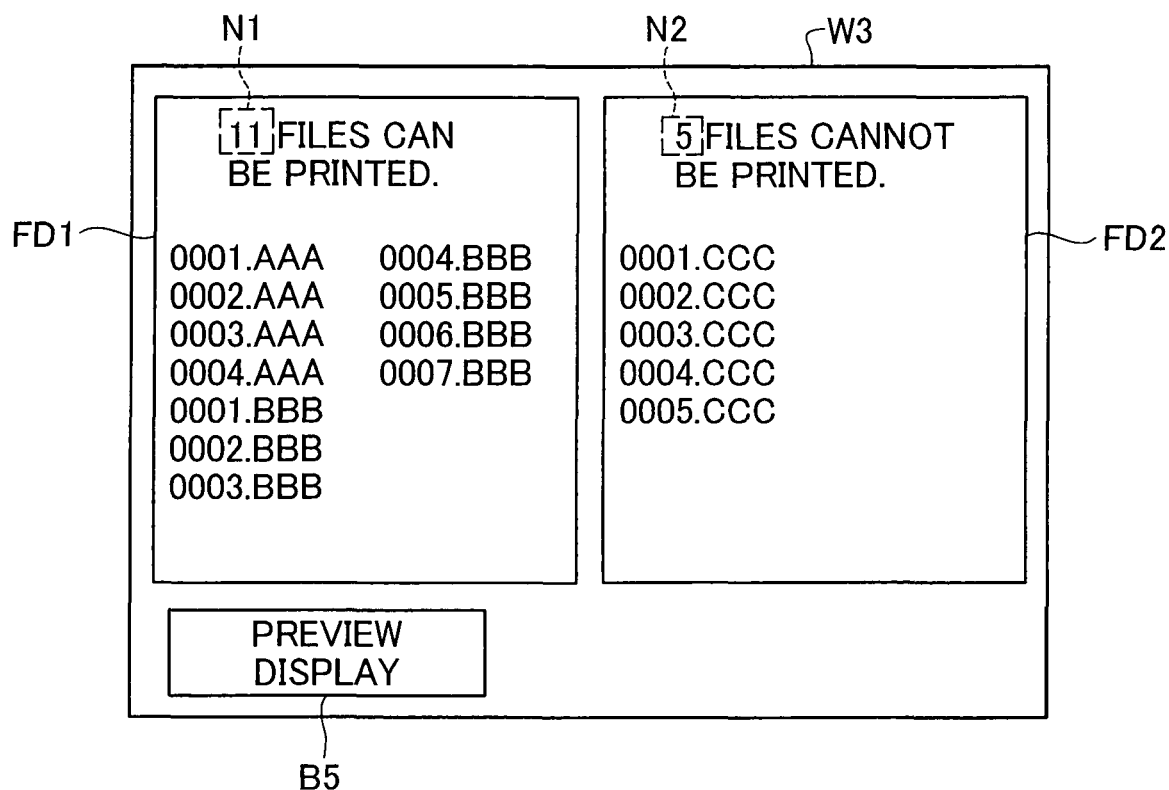
FIG. 6 is a diagram showing a file information display screen W3.

FIG. 6 is a diagram showing the file information display screen W3 displayed on the display panel 112. The file information display screen W3 is a screen that allows the user to verify which files from among RAW files stored in the removable memory 300 can be printed by the printer of the embodiment, and which files cannot be printed.

The file information display screen W3 includes file name display fields FD1, FD2 and a Preview Display button B5. The display control module 124 reads out the file names of developable RAW files from the memory 104 and displays them in the file name display field FD1 of the file information display screen W3. The display control module 124 also reads out the count value (=11) saved in the memory 104, and displays it, by way of the total number of printable RAW files, in the file name display field FD1 of the file information display screen W3 (N1 in the drawing).

In similar fashion, the display control module 124 reads out the file names of undevelopable RAW files from the memory 104 and displays them in the file name display field FD2 of the file information display screen W3. The display control module 124 also reads out the count value N2 (=5) saved in the memory 104, and displays it, by way of the total number of unprintable RAW files, in the file name display field FD2 of the file information display screen W3 (N2 in the drawing).

With this arrangement, the user can verify both the number of RAW files capable of being developed and printed by the printer, as well as the number of RAW files not capable of being developed and printed by the printer, from among RAW files stored in the removable memory 300. Consequently, printable files can be printed as-is by the printer, while unprintable files can undergo image processing on a computer and saved in JPEG format, and JPEG images then printed by the printer.

D. Embodiment 4

Next, Embodiment 4 will be described. The printer of Embodiment 4 is identical in configuration to the printer 100 of Embodiment 1, and therefore its configuration will not be described. In the present embodiment, it is assumed that the user takes pictures using Cameras A and B, as well as a compact digital camera D (hereinafter Camera D); and that photographic image data taken using Cameras A, B, and D has been saved on a single removable memory 300. Camera D is made by the same manufacturer as Camera B; where a photographic image is saved in RAW format, a RAW file D of file format D is created. This RAW file D has a file name composed of the extension "BBB" appended to "C+serial number" in the shooting order. For example, the RAW file D of the initially shot image will have the file name "C0001.BBB." The RAW files A, B, C include file information such as the respective manufacturer, camera model, version name and so on.

Let it be assumed that RAW files A with the file names "0001.AAA" through "0004.AAA", RAW files B with the file names "0001.BBB" through "0007.BBB", and RAW files C with the file names "C0001.BBB" through "C0005.BBB" have been saved to the removable memory 300.

In the present embodiment, as in Embodiment 1, the RAW profile saved in the memory 104 of the printer 100 describes information relating to Camera A and Camera B, but does not describe information relating to the RAW file D. Consequently, while the printer will be able to carry out a developing process for and direct printing of RAW image data contained in RAW files A and B, it cannot carry out a developing process for RAW image data contained in the RAW files D, and thus direct printing will not be possible. However, since the extension is the same as the "BBB" extension of the RAW files B, it cannot be determined simply from the extension whether the files are developable or not. The operation of the printer of Embodiment 4 for the purpose of addressing this issue will be described below.

Figure 7:
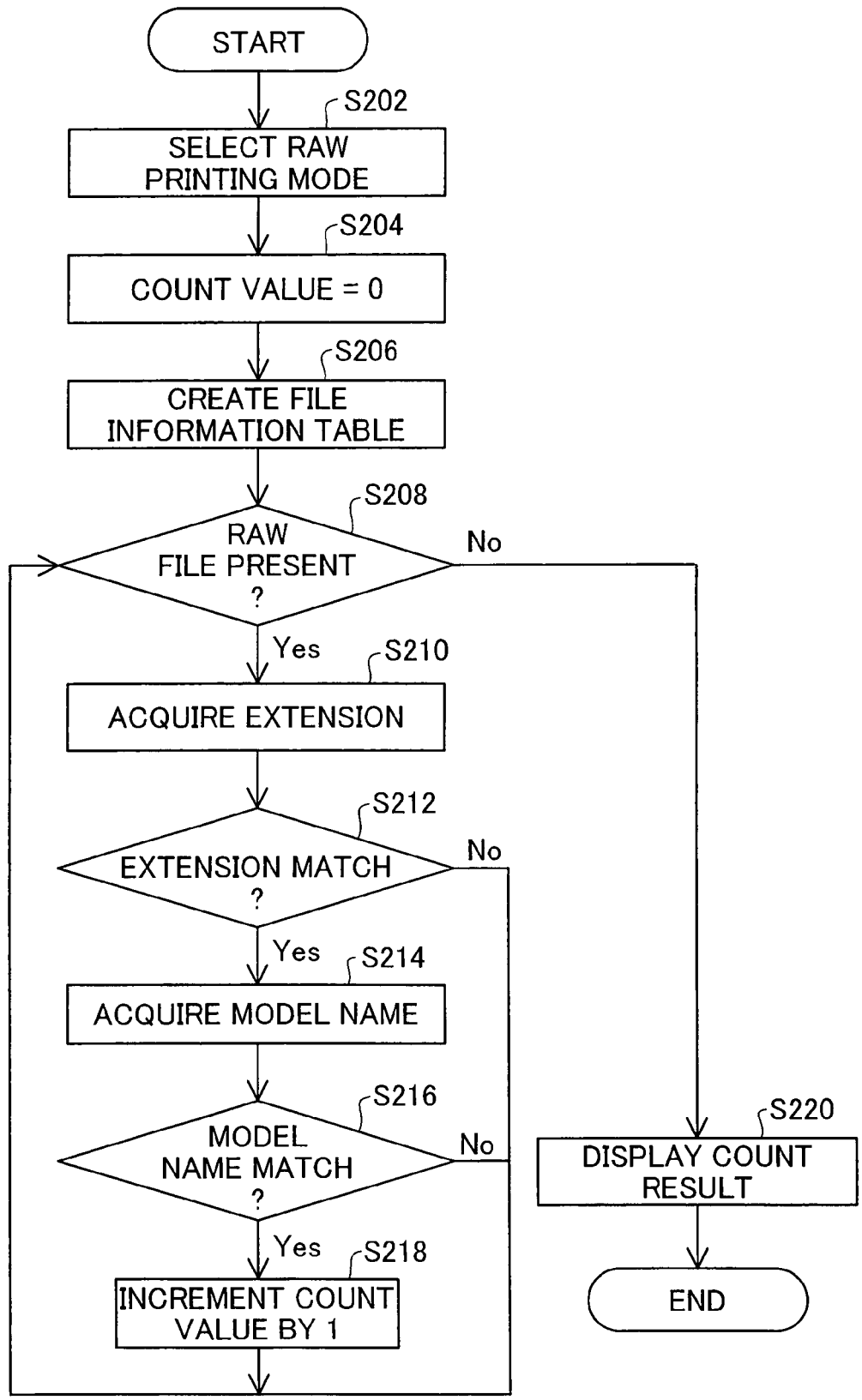
FIG. 7 is a flowchart showing a process for displaying on a display panel the total number of RAW files developable in the printer.

FIG. 7 is a flowchart showing a process for displaying on the display panel the total number of RAW files developable in the printer. When the user, using the control panel 114, selects RAW printing mode from the menu screen displayed on the display panel 112, the decision module 122 will recognize that RAW printing mode has been selected (Step S202), and will set to zero the count value stored in the memory 104 (Step S204). Extensions and camera models are then extracted from the information described in the RAW profile 142 stored in the memory 104, and a file information table is created (Step S206). As discussed previously, since the RAW profile 142 describes information relating to RAW files A and B, the file information table will describe "AAA" and "BBB" by way of extension information, and "Camera A" and "Camera B" by way of model information.

Next, the decision module 122 will decide in succession, for each RAW file stored in the removable memory 300, whether the extension appended to the RAW file matches any of the extensions described in the file information table; when a match is determined, it will then be decided whether the model information contained in the RAW file matches the extension described in the file information table.

Specifically, via the external memory controller 110, the decision module 122 searches the multiple RAW files stored in the removable memory 300, recognizes the RAW file "0001.AAA" that was the first to be recorded (Yes in Step S208), and acquires its file extension "AAA" (Step S210). Then, since as noted previously the file information table describes the extension "AAA," the decision module 122 will decide through lookup in the file information table that there is an extension match for the RAW file A "0001.AAA" (Yes in Step S212).

When there is an extension match for the RAW file A in the file information table, via the external memory controller 110 the decision module 122 will acquire the model name "Camera A" included in the RAW file A "0001.AAA" which is stored in the removable memory 300 and will decide that there is a model name match for the RAW file A "0001.AAA" (Yes in Step S116) since, as noted previously, "Camera A" is described in the file information table. Then, in the same manner as in Embodiment 1, it will increment the count value and save the file name "0001.AAA" in the memory 104 as a developable RAW file (Step S118). Extension and model name are acquired in similar fashion for the RAW files "0002.AAA" through "0004.AAA" and the RAW files B "0001.BBB" through "0007.BBB," then determinations are made as to whether these match those described in the file information table.

As mentioned above, the RAW profile describes information of various kinds relating to RAW files A and B; since the file information table describes the extensions "AAA," "BBB" and the model names "Camera A," "Camera B," the decision module 122 will make decisions analogously to the case of the RAW file A "0001.AAA," incrementing the count value by "1" for each file and saving the file name, together with the extension, in the memory 104. At this time, the count value will be "11" and the file names "0001.AAA" through "0004.AAA" and "0001.BBB" through "0007.BBB" will be saved as developable RAW files in the memory 104.

The decision module 122 will then search for the next file, recognize the file name "C0001.BBB" (Yes in Step S208), acquire the extension of the RAW file D "C0001.BBB," and make a decision in the same manner as above. As noted, since the extension "BBB" is described in the file information table, the decision module 122 will determine that there is an extension match for the RAW file D "C0001.BBB" (Yes in Step S212). Since there is a match with an extension described in the file information table, via the external memory controller 110 the decision module 122 will now acquire the model name "Camera D" included in the RAW file D "C0001.BBB" stored in the removable memory 300 (Step S214); however, since as noted previously, "Camera D" is not described in the file information table, it will decide through lookup in the file information table that there is no model name match for the RAW file D "C0001.BBB" (No in Step S216). For the RAW files D "C0002.BBB" through "C0005.BBB" as well, it will be decided in similar fashion that while there is an extension match, there is no model name match.

When the decision module 122 decides there is no model name match, it will not increment the count value or save the file name. Accordingly, at this point in the decision process, the count value will be "11," and the file names "0001.AAA" through "0004.AAA" and "0001.BBB" through "0007.BBB" will be stored in the memory 104 as developable RAW files.

The decision module 122 will then search for the next RAW file and recognize that there is no next RAW file (No in Step S208), whereupon it will issue an instruction to the display control module 124 to display the image selection screen W1 (FIG. 3); the display control module 124 will then display the count value (=11) on the image selection screen W1 (FIG. 3) displayed on the display panel 112 (Step S220).

In the present embodiment, as in Embodiment 1, the image selection screen W1 depicted in FIG. 3 is displayed on the display panel 112. The count result is displayed in the picture number display field ND, as the total number of printable files.

According to the printer of the present embodiment, the decision as to developability is made with reference not only to file extension but also to model name; and the total number of developable RAW files is displayed on the display panel 112, as the total number of RAW files for which direct printing is possible. Accordingly, the user can ascertain the total number of RAW files for which direct printing is possible. Thus, for example when the number of RAW files for which direct printing is possible is small, the user can easily decide whether it will be necessary to take measures such as performing the developing process with a PC using dedicated developing software, prior to printing.

E. Variations

The present invention is not limited to the embodiments and aspects described above. The present invention may be worked in various aspects within limits that involve no departure from the spirit of the invention; for example, the following variations are possible.

(1) While the preceding embodiments described a printer capable of performing a developing process on RAW image data, the present invention is implementable in various other kinds of image processing apparatus capable of performing a developing process on RAW image data, such as a display-equipped PC or photo storage device. Where the invention is implemented in a printer, it is not limited to consumer printers, and is also implementable in various printers such as commercial printing systems with advanced features. The invention is also implementable in multifunction devices equipped with scanner functions or the like.

(2) Whereas in the preceding embodiments, decisions as to whether RAW files are developable are made on the basis of the extension included in the file name of the RAW file, decisions could instead be made based on other information included in the file name. For example, let it be assumed that, when appending file names to RAW image data in digital cameras, Manufacturer A adopts the convention of appending an "A" at the beginning of the file name, while Manufacturer B appends a "B" at the beginning of the file name, followed in each case by a 4-digit serial number. In such a case, it could be decided on the basis of the lead character (including numeric and symbol characters) of the file name whether an "A" is appended at the beginning of the file name or whether a "B" is appended at the beginning of the file name; and when a "B" is appended, to then decide whether the file is developable by the printer 100, on the basis of the subsequent 4-digit number.

(3) Whereas the preceding embodiments described examples in which only RAW files are stored in the removable memory 300, image files besides RAW files (e.g. JPEG files) could be stored together as well. In such instances, the decision module 122 could be designed to decide whether files in the removable memory 300 are RAW files.

For example, when the removable memory 300 is connected with the external memory controller 110 by means of inserting the removable memory 300 into the card slot (not shown) of the printer 100, the decision module 122 may search the multiple files stored in the removable memory 300, and if a file has a "JPEG" extension, save the file name to the memory 104 as a JPEG file. When the extension is not "JPEG," in the same manner as in the preceding embodiments the decision module 122 may refer to the extension table and decide whether the RAW file is a developable RAW file. Files saved in formats besides JPEG but that are also printable without performing a developing process on the image data, e.g. the "GIF" or "BMP" formats, may also be decided to be non-RAW files. On the basis thereof, the number of files in JPEG or other save formats not requiring image processing may be counted and displayed. By so doing it will be possible for the user to ascertain the number of images not requiring image processing, the number of images requiring image processing, and the number of images that cannot be handled by the device in question.

(4) In the preceding embodiments, when the extension of a RAW file stored in the removable memory 300 does not match any of multiple extensions described in an extension table or file information table, the decision module 122 decides that the developing process cannot be carried out in the printer; however, it would also be possible to provide a function for updating the extension table, etc. For example, a Help screen for the purpose of updating the RAW profile could be displayed on the display panel 112 in the event there is no match for an extension. By following the instructions given on the Help screen displayed on the display panel 112, the user could then download a new RAW profile from the homepage of the printer manufacturer, and update the RAW profile in the printer. By so doing it is possible to increase the number of types of RAW files that can be developed in a printer (i.e. that can be directly printed).

Moreover, it would be possible to provide a function for updating not only the RAW profile, but also updating the program for executing the developing process or other image processing by the image processing module 106. For example, in a manner analogous to updating the RAW profile, a Help screen for the purpose of updating the image processing program could be displayed on the display panel 112, and the user would follow the instructions given on the Help screen to update the image processing program, thereby increasing the number of types of RAW files that can be directly printed by the printer 100, in the same manner as above.

(5) In Embodiment 4 described previously, in the event of a match with an extension described in the file information table, further reference is made to the model name included in the RAW file in order to decide whether the RAW file is developable in the printer; however, the decision could instead be made on the basis of other information, such as the version name of the file format, the manufacturer name, and so on.

Alternatively, whether to perform a check of file information could be associated with individual extensions, and the file information checked only for those extensions for which there is a possibility that both developable files and undevelopable files will exist. For example, in Embodiment 4 discussed previously, by creating associations such that file information will not be checked when the extension is "AAA" but file information will be checked when the extension is "BBB," it would be possible to dispense with checking of file information where the extension is "AAA." Consequently, processing time can be reduced.

(6) The process of determining whether RAW files stored in the removable memory 300 are developable in the printer 100 and counting the total number of developable RAW files (Step S104 through Step S114 of FIG. 2; Steps S204 through S218 of FIG. 5) may be carried out prior to selection of RAW printing mode by the user. By so doing, once the user has selected RAW printing mode, the display control module 124 need only read out and display the count value stored in the memory 104, thus reducing processing time from selection of RAW printing mode by the user to display of the count result on the display panel 112. Accordingly, the user will be able to quickly ascertain the total number of developable and undevelopable RAW files in the printer.

What is claimed is:

1. An image processing apparatus for performing a developing process on RAW image data included in a specific RAW file, comprising:
   a storage module configured to store character information corresponding to at least a part of a file name of a particular type of RAW file and file information included in the particular type of RAW file;
   a decision module configured to make a first decision as to whether the specific RAW file is developable or not in the image processing apparatus on the basis of the character information stored in the storage module and a file name of the specific RAW file and, if the first decision cannot be made, to make a second decision as to whether the specific RAW file is developable or not in the image processing apparatus on the basis of the file information stored in the storage module and file information that is acquired from the specific RAW file; and
   a display module configured to display information based on decision making results of the decision module.

2. The image processing apparatus according to claim 1, wherein the storage module stores character information for each of a plurality of types of RAW files and information about necessity of second decision making which is related to whether or not the second decision should be made for each of the plurality of types of RAW files; and
   the decision module decides whether or not the first decision can be made based on the file name of the specific RAW file and the information about necessity of second decision making.

3. The image processing apparatus according to claim 1, wherein the character information stored in the storage module corresponds to a file extension, and
   the file information included in the particular type of RAW file and the file information that is acquired from the specific RAW file are at least one of a name of a device that generates RAW files, a manufacturer name of the device, and a version name of a RAW file.

4. The image processing apparatus according to claim 1, wherein the display module displays information for updating a RAW profile included in the image processing apparatus, when the decision module determines in the first decision that the specific RAW file is not developable in the image processing apparatus.

5. The image processing apparatus according to claim 1, wherein, when it is determined that the specific RAW file is not developable in the image processing apparatus, the information displayed by the display module comprises information related to the specific RAW file.

6. The image processing apparatus according to claim 1, wherein the file information included in the particular type of RAW file and the file information that is acquired from the specific RAW file are at least one of a model name of a device that generates RAW files and a manufacturer name of the device.

7. A method of displaying information relating to a specific RAW files acquired by an image processing apparatus on a display screen provided to the image processing apparatus, comprising:

storing character information corresponding to at least a part of a file name of a particular type of RAW file and file information included in the particular type of RAW file;

making a first decision as to whether the specific RAW file is developable or not in the image processing apparatus on the basis of the stored character information and a file name of the specific RAW file;

if the first decision cannot be made, making a second decision, as to whether the specific RAW file is developable or not in the image processing apparatus on the basis of the stored file information and file information that is acquired from the specific RAW file; and displaying information based on the results of the first and second decisions.

8. The method of claim 7, wherein the file information included in the particular type of RAW file and the file information that is acquired from the specific RAW file are at least one of a model name of a device that generates RAW files and a manufacturer name of the device.

9. A computer program product for use with an image processing apparatus equipped with a display and adapted to display on the display information relating to a specific RAW files acquired by the image processing apparatus, the computer program product comprising:

a non-transitory computer readable medium; and a computer program stored on the non-transitory computer readable medium, the computer program comprising:

a first program for storing character information corresponding to at least a part of a file name of a particular type of RAW file and file information included in the particular type of RAW file;

a second program for making a first decision as to whether the specific RAW file is developable or not in the image processing apparatus on the basis of the stored character information and a file name of the specific RAW file and, if the first decision cannot be made, for making a second decision as to whether the specific RAW file is developable or not in the image processing apparatus on the basis of the stored file information and file information that is acquired from the specific RAW file; and a third program for displaying on the display information based on the results of the first and second decisions.

10. The computer program product of claim 9, wherein the file information included in the particular type of RAW file and the file information that is acquired from the specific RAW file are at least one of a model name of a device that generates RAW files and a manufacturer name of the device.

* * * * *